United States Patent [19]

Drews et al.

[11] 4,089,317
[45] May 16, 1978

[54] APPARATUS FOR MIXTURE ENRICHMENT IN AN INTERNAL COMBUSTION ENGINE

[75] Inventors: Ulrich Drews, Vaihingen-Pulverdingen; Lothar Winkelmann, Ludwigsburg; Hans Schnürle, Walheim, all of Germany

[73] Assignee: Robert Bosch GmbH, Stuttgart, Germany

[21] Appl. No.: 685,649

[22] Filed: May 12, 1976

[30] Foreign Application Priority Data

May 20, 1975 Germany .......................... 2522283

[51] Int. Cl.² .............................................. F02B 3/00
[52] U.S. Cl. ............................ 123/179 L; 123/32 EG
[58] Field of Search .......... 123/32 EA, 32 EG, 179 L

[56] References Cited

U.S. PATENT DOCUMENTS

| 3,646,915 | 3/1972 | Rachel | 123/32 EG |
|---|---|---|---|
| 3,716,034 | 2/1973 | Schmid | 123/32 EG |
| 3,734,067 | 5/1973 | Glockler | 123/32 EG |
| 3,771,502 | 11/1973 | Reddy | 123/32 EG |
| 3,792,693 | 2/1974 | Luchaco | 123/32 EG |
| 3,971,354 | 7/1976 | Luchaco | 123/179 L |

*Primary Examiner*—Ronald B. Cox
*Attorney, Agent, or Firm*—Edwin E. Greigg

[57] ABSTRACT

A control circuit for a fuel injection system of an internal combustion engine supplies a corrective current to the main multivibrator during and/or after engine starting. The corrective current is supplied on the basis of temperature dependent signals and on the basis of the pulse width of the primary injection signals, which is related to engine rpm and load.

9 Claims, 3 Drawing Figures

APPARATUS FOR MIXTURE ENRICHMENT IN AN INTERNAL COMBUSTION ENGINE

BACKGROUND OF THE INVENTION

The invention relates to an apparatus for the enrichment of the mixture supplied to an internal combustion engine by a fuel injection system. The fuel injection system includes an electronic monostable multivibrator which delivers fuel injection control pulses whose length depends on the aspirated air quantity and the engine rpm. The apparatus includes a constant current source which charges a capacitor linearly and determines the magnitude of an adjustable supplementary current which can be admitted to the fuel injection controller for prolonging the duration of fuel injection.

It is known that just after starting, and in some cases during starting, an internal combustion engine, for example an Otto engine, requires a somewhat enriched fuel-air mixture to insure smooth running.

It is generally intended that this enrichment be gradually reduced to zero during a predetermined amount of time. It is known to employ a circuit which delivers a useable output potential which changes linearly, for example to the negative supply voltage. This known circuit includes a capacitor connected in a Darlington-like circuit of two transistors in which, after the capacitor has almost completely discharged due to the starting process, a gradual charging takes place which produces a desired potential shift at one of the electrodes of the capacitor. The capacitor and its associated transistors are connected in a so-called Miller integrator. In this known circuit, after the starting process is terminated, the linear potential decrease is initiated and terminated after a predetermined time. However, in this known circuit, it is not possible to account for any possible special requirements of the engine, for example the engine temperature, the rpm or the load factor. However a truly optimum adaptation of the mixture, during the start or post-start operation, requires a very sensitive adaptation which must take into account the prevailing engine conditions.

OBJECT AND SUMMARY OF THE INVENTION

It is a principal object of the invention to provide an apparatus for fuel enrichment during starting which permits a sensitive and optimal adaptation of the fuel mixture supplied to the engine with due consideration to the operational state of the engine.

This principal object is attained by an apparatus according to the invention by providing a circuit which alters the supply voltage used by the fuel controller in dependence on engine temperature. It is a further object of the invention to provide an apparatus in which the supply voltage is cycled depending on the prevailing rpm and load condition of the engine.

By this means it is possible to include the effect of the prevailing engine temperature into the fuel enrichment process after starting and furthermore, the starting or post-starting enrichment is attuned to the prevailing load and rpm condition of the engine. This is desirable and necessary because the engine operation is different when the vehicle is moved immediately after engine start and the engine is thus loaded either uniformly or heavily, or whether the operator permits the engine to idle for a certain period of time after starting.

The invention will be better understood as well as further objects and advantages thereof become more apparent from the ensuing detailed specification of a preferred embodiment taken in conjunction with the drawing.

DESCRIPTION OF THE PREFERRED EMBODIMENT

Before discussing in detail the circuit for starting or post-starting enrichment according to the invention, it will be useful to discuss, in principle, the operation of the fuel injection controller with which the apparatus according to the invention is associated to provide starting or post-starting enrichment. It should be noted that the fuel injection controller discussed here is a general type and the invention is not limited to being used with any particular one of such fuel injection controllers.

An important constituent of a fuel injection system of the type used in conjunction with the invention includes a control multivibrator circuit which delivers an output pulse $t_p$ (see FIG. 1) whose duration is a function of the engine rpm and of the air quantity aspirated by the engine and determines the length of the control signal eventually delivered to the injection valves of the engine. For this purpose, the control multivibrator includes a monostable multivibrator whose feedback path includes a timing capacitor. The unstable time constant of this monostable multivibrator thus determines the charge exchange timing of the capacitor which, in turn, is defined by the operation of a charging current source and a discharge current source. The discharge current source is a measure of the air quantity supplied to the engine while the charging current is delivered in an rpm-synchronous manner.

Figure 1:
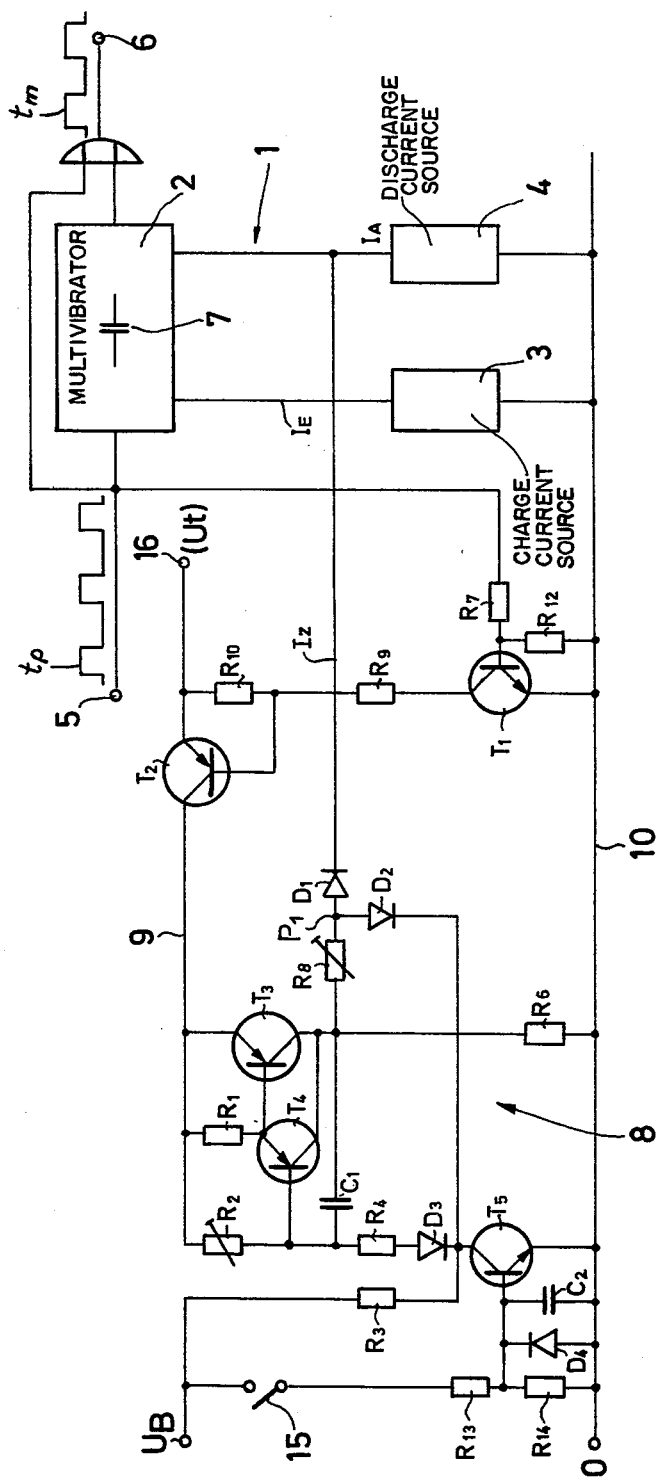
FIG. 1 is a schematic diagram of a portion of the fuel injection system to which the circuit according to the invention is associated.

In this manner, output pulses $t_p$ are generated and supplied to the contact 5 in FIG. 1. The duration of these pulses is a measure for the fuel quantity to be injected per suction stroke, i.e., per crankshaft revolution and is, as already explained, a measure of the engine rpm and load.

Thus the primary control parameters for fuel metering, i.e., the air flow rate and the engine rpm, are already contained in the duration of the pulse $t_p$. For optimum adaptation of the fuel quantity to particular operational states of the engine, this pulse width must be corrected, by sometimes substantial amounts. For this purpose, the first so-called control multivibrator circuit is followed by a second stage designated with the numeral 1 in FIG. 1 whose purpose it is to extend the pulse duration $t_p$ firstly to provide a more suitable control signal for electromagnetic injection valves, i.e., to provide an output pulse $t_m$ at a contact 6 and, furthermore, to permit the possibility of adjusting the pulse width to take account of other corrective measures. One of these corrective measures it that provided by the circuit according to the invention which will be explained in detail below and which takes account of special conditions prevailing at or just after engine starting.

It should be noted that the secondary circuit 1, which is the subject of the present invention, operates in general in a similar manner to that of the control multivibrator and will be referred to subsequently as a multiplying circuit. This multiplying circuit 1 also includes a monostable multivibrator 2 with two associated constant-current sources 3 and 4, the constant-current source 4 providing the charging current $I_A$ while the constant-current source 3 provides the discharge current $I_E$ for a timing capacitor 7.

The multiplier circuit 1 operates in such a manner that, during the pulse duration $t_p$ fed to the contact 5, the capacitor 7 is charged with the charging current of magnitude $I_A$. Subsequently, the multivibrator is triggered and the capacitor discharges at a rate defined by the discharge current $I_E$. The duration of the discharge process is equal to the time constant $t_m$ of the monostable multivibrator 2. Normally, the charging and discharging currents are nearly equal. Both of these currents can be changed to correct for particular operational conditions; in particular, supplementary currents may be added or subtracted from the main currents $I_E$ and $I_A$. Under such conditions, the net charging and discharging currents are altered, which has an immediate effect on the time constant of the monostable multivibrator 2. Since the voltage changes at the timing capacitor 7 are small, it is suitable to effect only minor corrections on the charging side, i.e., by changing the charging current $I_A$, as is the case for the present correction based on starting and post-starting fuel enrichment.

The apparatus according to the invention for fuel enrichment during starting and post-starting conditions, subsequently referred to as a post-start enrichment circuit, is designated in FIG. 1 with the general reference numeral 8 and includes two transistors T3 and T4 connected somewhat in the manner of a Darlington circuit which, together with a capacitor C1, form a so-called Miller integrator. In particular, the emitter of the transistor T3 is connected directly to the positive supply line 9 while its collector is connected through a resistor R6 to the negative supply line 10. It should be noted that the relative polarities of the connections and the semiconductor electrodes are chosen only to illustrate a particular embodiment and the substitution of different types of transistors would change the relative polarities in appropriate and known manner. The conductors 9 and 10 are the lines which provide the circuit 8 with its primary supply voltage and the potential which they carry is different from other voltage supply lines referred to below which are also present in the circuit of FIG. 1.

The base of the transistor T3 is connected to the emitter of the transistor T4 and goes to the positive supply line 9 through a resistor R1. The collectors of the transistors T3 and T4 are joined to form a Darlington-like configuration. The base of the transistor T4 is connected through an adjustable resistor R2 to the plus line 9 and is also connected in series with a resistor R4 and a diode D3 to the collector of a further transistor T5 whose emitter is at the potential of supply line 10. The base of the transistor T4 is further connected to a capacitor C1 which is part of the Miller integrator and whose other electrode is connected to the junction of the collectors of transistors T4 and T3.

The transistor T5 associated with the base circuit of the transistor T4 is a switch-on device for the Miller integrator T3, T4. The base of the transistor T5 is connected through a resistor R13 in series with a switch 15 to the positive supply voltage $u_b$ which may be equal to the vehicle battery voltage. During engine starting, the switch 15 would be closed so that the base of transistor T5 receives a positive voltage and becomes fully conducting. After the starting, the switch 15 is reopened and thus the switching function of the switch 15 may be performed by the usual starter contact of a motor vehicle to supply a positive voltage to the base of the transistor T5. The base of the transistor T5 is also connected via the parallel configuration of a resistor R14, a diode D4 and a capacitor C2 to ground or to the supply rail 10. The latter configuration is required for counteracting very large voltage transients, especially negative transients, such as occur in this part of the circuit which includes the starter switch 15, at the termination of engine starting. Such voltage peaks result from energy storage in the windings of the various coils and electric motors which take part in the starting and whose magnetic fields collapse at the termination of the starting process. The diode D4 short-circuits any negative voltages occurring at the base of the transistor T5 and these voltages are divided by the resistors R13 and R14. The function of the capacitor C2 is similarly to counteract the effect of rapid and large voltage peaks in the region of the base electrode of the transistor T5.

Before treating the details of the operation of the post-start enrichment circuit 8, there will now be explained the general function of the remainder of the circuit elements contained in the apparatus according to the invention. The positive supply voltage carried by the line 9 is obtained through the collector-emitter path of the transistor T2 from a contact point 16 to which is supplied a voltage $u_t$, i.e., a voltage which depends in the appropriate and predetermined manner on the engine temperature. The emitter and base of the transistor T2 are connected through a resistor R10 and the base of the transistor T2 is further connected through a resistor R9 with the collector-emitter path of a transistor T1 and hence to ground or the supply line 10. Thus, the switching state of the transistor T1, whose base is supplied through the resistor R7 with the above-mentioned pulses $t_p$ from the control multivibrator circuit, also determines the state of conduction of the transistor T2. If the transistor T1 has been made conducting by a particular pulse $t_p$, it pulls the voltage at the resistor R10 to ground, thus insuring a sufficient voltage drop on the base-emitter path of the transistor T2 which renders the transistor T2 conducting. Thus the temperature-dependent supply voltage from the contact 16 reaches the plus line 9. When the particular pulse $t_p$ decays, both transistors T1 and T2 become non-conductive and the post-start enrichment circuit 8 is deenergized, but the dynamic condition of the circuit prevailing at that instant will be maintained.

The output signal from the post-start enrichment circuit 8 is taken from the collector of the transistor T3 at its junction with the capacitor C1, the resistor R6 and the collector of transistor T4 and travels through an adjustable resistor R8 to a junction point P1 whence it flows through a diode D1 and supplies a supplementary current $I_z$ which is added to the charging current $I_A$ and thus helps to determine the discharge time of the capacitor 7 and hence the duration of the output pulses from the entire circuit. The junction point P1 is also connected through a diode D2 to the collector of the transistor T5 which is connected through a resistor R3 to the constant positive main supply voltage $u_b$.

In discussing the operation of the post-start enrichment circuit 8, it will be assumed now that the supply voltage on the positive line 9 is not cycled by the transistors T1 and T2. Furthermore, the diode D2 which joins the junction point P1 to the collector of the transistor T5 can be assumed omitted depending on whether the enrichment of the fuel-air mixture provided by the present circuit takes place during the pure engine starting and continues in decreasing magnitude after the starting switch has been opened or, on the other hand, if the enrichment only begins after the engine start has occurred and when other circuits take care of conditions during the actual start.

During the engine starting, the starter switch 15 is closed, and thus the transistor T5 conducts and the Darlington-like circuit of transistors T3 and T4 is also made conducting via the series connection of the diode D3 and the resistor R4. Thus, the electrode of the capacitor C1 connected to the collector of the transistor T3 receives the potential prevailing at the positive line 9 minus the residual voltage at the Darlington output; the potential at the other electrode of the capacitor C1 remains lower than the supply voltage by an amount equal to the base-emitter voltage of the Darlington circuit. Since the resistor R4 is preferably of low value, the foregoing circuit leads to a very rapid and almost complete discharge or, more precisely, charge exchange of the capacitor C1. The positive potential prevailing at the collector of the transistor T3 travels to the junction point P1 through the adjustable resistor R8 which defines the absolute magnitude of the supplementary current $I_s$. At this point, it is important to inquire whether, during the initial starting, current has flowed through the diode D1 to the charging current source 4. If the diode D2 is not present, this would definitely have been the case. If the diode D2 is present however, it conducts during the above-described condition of the circuit and thus lowers the potential at the junction P1 far enough so that a supplementary current cannot flow.

If the starter switch 15 is now open, the transistor T5 is blocked and its collector potential is raised to that of the positive supply line so that the diode D3 also blocks and the partial circuit (Miller integrator) formed by the transistors T3 and T4 acts independently.

Figure 2:
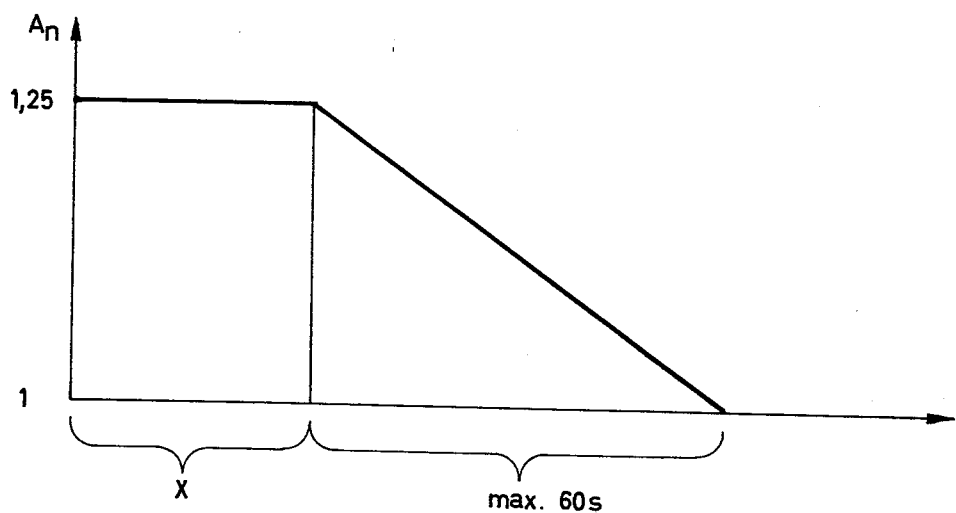
FIG. 2 is a graph showing the degree of fuel enrichment as a function of time due to the operation of the apparatus according to the invention.

The quiescent current of the transistor T5 flows through the resistor R3 inasmuch as the diode D3 is definitely maintained in the blocked condition by the circuit and also due to the existence of the positive potential at the resistor R3. At the same time, of course, the diode D2 also blocks (if present) and thus opens up the current path from the resistor R8 through the diode D1 to the charging current source 4. The partial circuit including the transistors T3 and T4 and the capacitor C1, as well as the associated resistors, operates according to the known principle of a Miller integrator, i.e., the base current for the transistor T4 is supplied by the capacitor C1 so that the transistor T4 conducts. The transistor T3 then also conducts but, at the same time, the potential of both collectors increases, which limits the base current of this Darlington circuit automatically. Thus, the useable potential at the collector of the transistor T3 linearly decreases from the maximum possible positive value to the negative value or to ground as may be seen in the diagram of FIG. 2. The graph of FIG. 2 shows that, during the starting process, i.e., in the region X, the enrichment factor $A_n$ has the value 1.25, given merely as a numerical example; however, during this time, the enrichment factor comes into play only if desired because the effectiveness of this enrichment factor depends on the presence or absence of the diode D2. After the starting process has terminated, i.e., after the engine has started or else the starting switch 15 has been opened, the collector potential at the transistor T3 decreases linearly through the adjustable resistor R8 so that a supplementary current $I_s$, which behaves in a similar manner, reaches the charging current source 4. The circuit elements and their values may be so chosen as to obtain any desired decay constants, preferably a decay time extending to a maximum of 60 seconds for example. In addition, the charging time of the capacitor C1 and hence the degree of mixture enrichment may also be made dependent on the rpm by cycling the voltage of the supply line 9, since the pulse train $t_p$ from the control multivibrator circuit which controls the transistor T1 is itself rpm-dependent. However, this charging time of the capacitor C1 may also be made dependent on engine load which is expressed in the duty-factor. It is reasonable that, when the engine is fully loaded, the duration of post-start fuel enrichment need not be as long as would be the case if it is operating substantially at idle right after engine starting; for example, when the vehicle is stopped at traffic lights for substantial periods of time in city traffic.

In other words, cycling the supply voltage permits a very wide range of variations for changing the degree of charging of the capacitor C1 because the duty ratio of the pulse train $t_p$ may contain information regarding very great differences in the load of the engine.

In the post-start enrichment circuit 8, the cycling of the supply voltage is effected in such a manner that, during the period when the pulse is zero, i.e., when the collector potential of the transistors T3 and T4 drops to zero during the blockage of the transistor T2, the charge on the capacitor C1 is maintained. However, during this condition, even very small residual currents could lead to a falsification, i.e., an undesirable change of the charge on the capacitor C1. For this reason, the circuit of transistors T3 and T4, as shown in FIG. 1, is of substantial importance because only when such a configuration of elements is used, are all p-n transitions blocked, i.e., during the absence of a pulse on the supply line 9, the transistors T3 and T4 are both blocked.

In principle, the cycling of the supply voltage requires the joining of the two collectors of the transistors T3 and T4 which form the Miller integrator because only in this manner is it possible to prevent the transistor T3 from traversing its saturation region whenever the supply voltage is restored and such an occurrence would result in a substantial error in the duration of post-start enrichment or in its time dependent decrease.

Such a non-linear behavior is particularly noticeable at the beginning of the discharge process because, as long as the transistor T5 is conducting, it provides a sufficient base current for the transistors T3 and T4 that both of these transistors would saturate if the collector of the transistor T4 were not joined with that of the transistor T3, i.e., they would both be in a condition of low current amplification and a substantial charge increase would be required in the capacitor C1 so that both transistors would reach their desired active region. This charge increase is, so to speak, lost to the overall charging process of the capacitor C1. Only when both transistors are in their active region is the charging current for the capacitor C1 determined by the adjustable resistor R2 and the two base-emitter voltages of the transistors T3 and T4 in a desired manner for effecting the linear charging (or charge exchanging) of the capacitor C1. By connecting the collectors of the transistors T3 and T4, the residual voltage of the output lies outside of the saturation region so that this region need not be traversed during the charge exchange of the capacitor C1.

It has already been mentioned above that the contact 16 of the circuit of FIG. 1 receives a temperature-dependent supply voltage which may be obtained, for example, from an appropriate temperature-dependent circuit, for example from an appropriate warm-up related output of the fuel injection system of the engine. Of course, this output may also be obtained by using a temperature-dependent NTC resistor in known manner from a known suitable circuit at an appropriate location of the engine.

Figure 3:
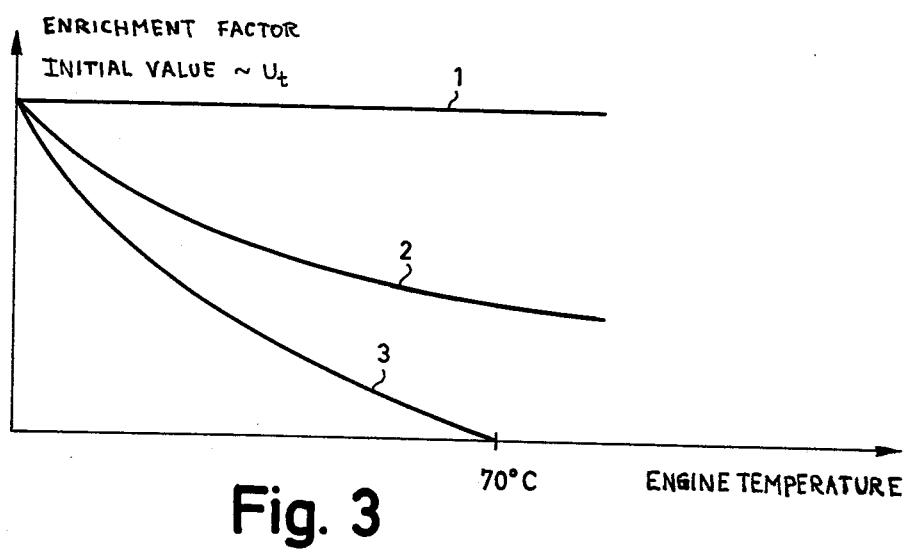
FIG. 3 is a graph showing the initial value of the fuel enrichment factor as a function of engine temperature in three possible positions of adjustment.

The diagram of FIG. 3 shows three possible values of the supply voltage $u_t$ as a function of the engine temperature. The curve 1 shows the voltage at the contact 16 to be independent of temperature and could thus be equal to the overall supply voltage $U_b$. The curves 2 and 3 shows two different types of behavior of the temperature-dependent voltage $U_t$ in which the curve 3 shows that the enrichment factor, i.e., the voltage of the line 9, decreases to zero at a particular predetermined engine temperature, in the present example shown to be 70° C, so that no further enrichment takes place. In curve 2, the enrichment factor approaches an arbitrary limit for any desired elevated engine temperature. The adjustment of these curves is made in harmony with the prevailing parameters of use, etc. of the engine.

The above-described circuit for post-start enrichment makes it possible to change, i.e., enrich the fuel-air mixture fed to the engine during and after starting in a very sensitive and flexible manner, thereby guaranteeing satisfactory engine operation.

The foregoing is a description of an exemplary preferred embodiment of the invention and many variations and different embodiments of the invention are possible within the spirit and scope thereof, the latter being defined by the appended claims.

What is claimed is:

1. An apparatus for controlling fuel injection to an internal combustion engine, comprising:
    a fuel injection control circuit with first multivibrator means for generating fuel injection control pulses in dependence on engine rpm and air flow rate; and
    a timing circuit for changing said control pulses to thereby engender fuel mixture enrichment, said timing circuit including voltage supply means for generating a supply voltage to said timing circuit as a function of engine temperature, said voltage supply means including switching means for altering the continuity of said supply voltage as a function of engine speed and engine load.

2. An apparatus as defined by claim 1, wherein said timing circuit includes first and second transistors and an associated capacitor, the base of said first transistor being coupled to the output of a transistor amplifier, the base electrode of which receives signals from the starting circuit of the engine which render it conducting, and wherein the collector of said first transistor is connected directly to the collector of said second transistor and wherein said capacitor is connected between the collectors of said first and second transistors and the base of said first transistor.

3. An apparatus as defined by claim 2, wherein the base of said first transistor is connected through a resistor and a diode to the collector of said transistor amplifier, and wherein the collector of said transistor amplifier is further connected through a resistor to the positive voltage source of said apparatus.

4. An apparatus as defined by claim 3, wherein the base of said transistor amplifier is connected in series with a resistor, a diode and a capacitor to the ground conductor of the apparatus and is further connected through a resistor and a switch to the positive supply voltage of the apparatus, said switch being closed during engine starting.

5. An apparatus as defined by claim 4, wherein the junction of the collectors of the first and second transistors of said circuit means is connected through an adjustable resistor with a point of the circuit to which are connected the anode of a diode whose cathode is joined to a portion of said control circuit which serves as a charging source for the timing capacitor of said multivibrator means and where said junction is further connected with the anode of a second diode whose cathode is connected to the collector of said transistor amplifier; whereby during engine starting, said second diode conducts and lowers the potential at said junction point.

6. An apparatus as defined by claim 5, further comprising a third transistor whose emitter-collector path lies in series with a secondary voltage supply line of said circuit means; whereby the voltage supplied to said secondary voltage line is interrupted by said third transistor in dependence on rpm and engine load.

7. An apparatus as defined by claim 6, wherein the emitter of said third transistor is connected through a resistor with its own base and is further connected to another resistor in series with the collector-emitter path of a fourth transistor whose base is provided with signals relating to rpm and engine load.

8. An apparatus as defined by claim 7, wherein the collector-emitter path of said third transistor receives a secondary supply voltage from temperature-dependent means in said fuel injection system.

9. An apparatus as defined by claim 1, wherein said switching means is connected to said fuel injection control circuit for receiving control signals corresponding to said fuel injection control pulses.

* * * * *